(12) United States Patent
Palmieri

(10) Patent No.: US 8,434,053 B2
(45) Date of Patent: Apr. 30, 2013

(54) PACKAGE REVIEW PROCESS WORKFLOW

(75) Inventor: John Palmieri, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 903 days.

(21) Appl. No.: 12/324,756

(22) Filed: Nov. 26, 2008

(65) Prior Publication Data

US 2010/0131961 A1 May 27, 2010

(51) Int. Cl.
*G06F 9/44* (2006.01)
*G06Q 99/00* (2006.01)

(52) U.S. Cl.
USPC ........... 717/101; 717/100; 717/102; 717/103; 717/110; 717/120; 717/121; 717/123; 717/124; 717/125; 705/317

(58) Field of Classification Search .................. None
See application file for complete search history.

(56) References Cited

U.S. PATENT DOCUMENTS

| | | | | |
|---|---|---|---|---|
| 6,058,493 A | * | 5/2000 | Talley | 714/38.1 |
| 6,199,193 B1 | * | 3/2001 | Oyagi et al. | 717/101 |
| 7,313,564 B2 | * | 12/2007 | Melamed et al. | 717/124 |
| 7,904,802 B1 | * | 3/2011 | Kolawa et al. | 715/230 |
| 2002/0066079 A1 | * | 5/2002 | Ionescu | 717/127 |
| 2005/0065953 A1 | * | 3/2005 | Bower et al. | 707/101 |
| 2005/0216882 A1 | * | 9/2005 | Sundararajan et al. | 717/104 |
| 2007/0168970 A1 | * | 7/2007 | Li et al. | 717/124 |
| 2007/0220479 A1 | * | 9/2007 | Hughes | 717/100 |
| 2008/0092107 A1 | * | 4/2008 | McWilliam et al. | 717/101 |
| 2009/0125283 A1 | * | 5/2009 | Conover | 703/1 |
| 2009/0249299 A1 | * | 10/2009 | Farchi et al. | 717/125 |
| 2010/0023928 A1 | * | 1/2010 | Hentschel et al. | 717/124 |

* cited by examiner

*Primary Examiner* — Emerson Puente
*Assistant Examiner* — Charles Swift
(74) *Attorney, Agent, or Firm* — Lowenstein Sandler LLP

(57) ABSTRACT

A workflow module automates and monitors a package review process. A package review module receives a package created by a contributor to be reviewed for compliance with a set of guidelines. The workflow module initiates, monitors, and manages a plurality of package review tasks to be performed on the package. A user interface module provides user interface for creating a package and a user interface for reviewing a package. The workflow module automates review tasks, interfaces with external servers performing review tasks, gathers review task results, determines whether to send a notification regarding the status of a review task, sends notifications regarding the status of a review task and stores successfully review packages in a repository.

20 Claims, 5 Drawing Sheets

_US 8,434,053 B2_

PACKAGE REVIEW PROCESS WORKFLOW

TECHNICAL FIELD

Embodiments of the present invention relate to a method and system for package review. Specifically, the embodiments of the present invention relate to a method and system for automating and monitoring review tasks performed on a software package.

BACKGROUND

A software package created by a software contributor undergoes a package review process involving a number of review tasks. For example, a software package is examined to ensure the package is formatted correctly, the package compiles and builds successfully, and the package conforms to packaging guidelines, package naming guidelines, licensing guidelines, etc. A package reviewer (i.e., a person authorized to review a package) manually performs many of these review tasks. The review process is completed in a matter of days or at times, the review process languishes for a number of months because a package reviewer is not available to review a package, a package reviewer does not know a package is ready for review, or a package reviewer does not know that a task is complete and the next review task is ready to be performed. Such a process has proven to be an inefficient process.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and system for automating and monitoring a package review process. The package review system includes a package review module to receive a package created by a contributor to be reviewed for compliance with a set of guidelines. The package review module performs automated review tasks on the package. A workflow module initiates, monitors, and manages a plurality of package review tasks to be performed on the package defined by a package review workflow. The workflow module automates review tasks, interfaces with external servers performing review tasks, generates and gathers review task results, determines whether to send a notification regarding the status of a review task, sends notifications regarding the status of a review task and stores successfully reviewed packages in a repository. A user interface module provides a user interface for creating a package and a user interface for reviewing a package. This method and system allows a software package review process to be automated and monitored by using a package review system.

Figure 1:
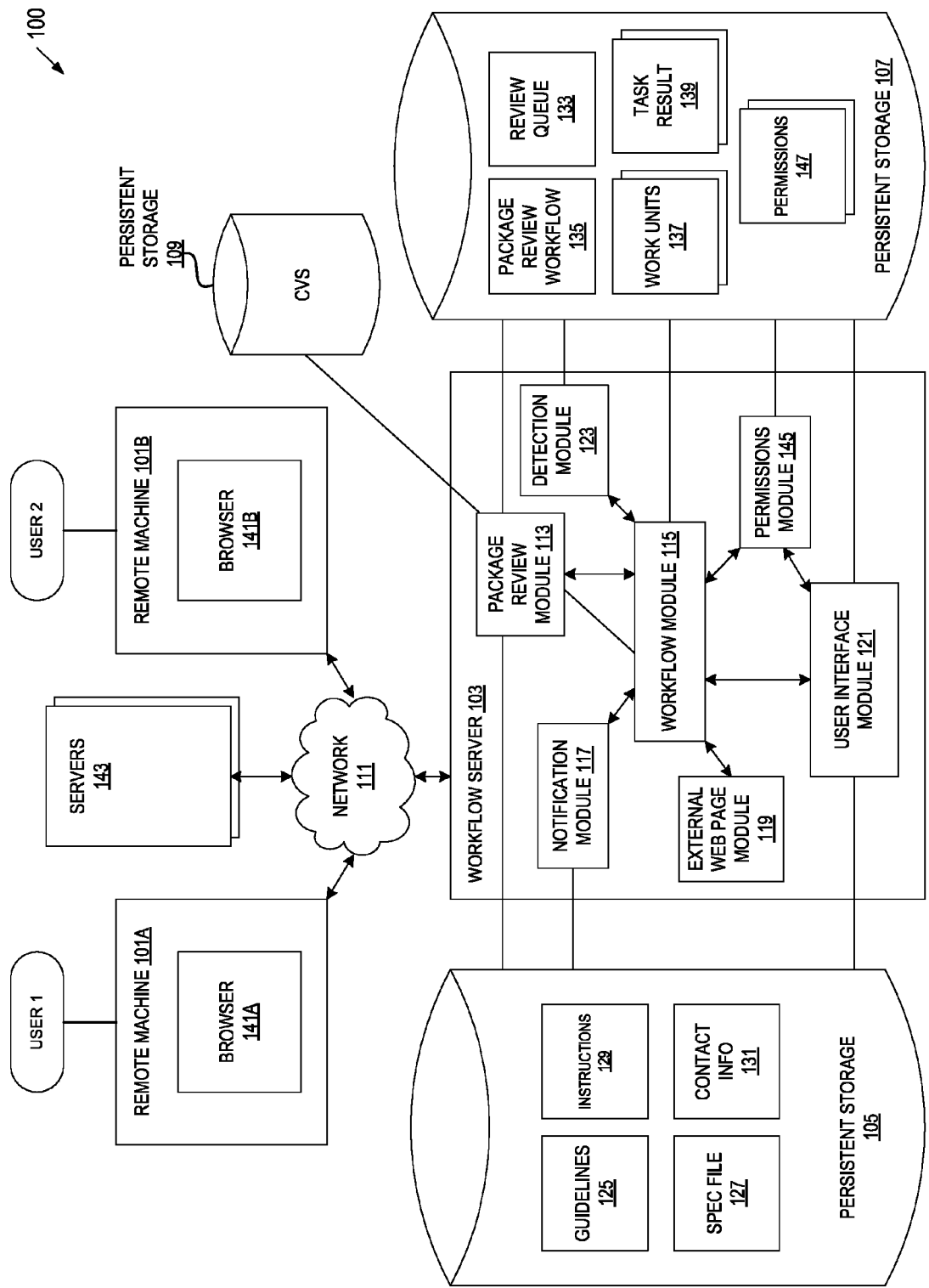
FIG. 1 is a diagram of one embodiment of a package review system.

FIG. 1 is a diagram of one embodiment of the package review system 100. The system 100 includes a workflow server 103, a persistent storage unit 105 for saving package review data, a persistent storage unit 107 for storing workflow data and a persistent storage unit 109 for storing software packages. The workflow server 103 can be accessible to any number of user machines and users through a network 111. The network 111 can be local area network (LAN), such as an intranet within a company, a wide are network (WAN), such as the Internet or similar communication system. The network 111 can include any number of networking and computing devices including any number of wired and wireless devices.

The workflow server 103 automates and monitors tasks for reviewing a software package. The workflow server 103 includes a package review module 113, workflow module 115, a notification module 117, an external web page module 119, a user interface module 121, a detection module 123, a permissions module 145 and similar components. This division of functionality is presented by way example for sake of clarity. One skilled in the art would understand that the functionality described could be combined into a monolithic component or sub-divided into any combination of components.

The package review module 113 receives a software package submitted for review from a user (e.g., a software contributor) over network 111. The package review module 113 stores the package in a review queue 133 in a persistent storage unit 107. The persistent storage unit 107 may be a local storage unit or a remote storage unit. The persistent storage unit 107 may be a magnetic storage unit, optical storage unit, solid state storage unit or similar storage unit. The persistent storage unit 107 can be a monolithic device or a distributed set of devices. A 'set,' as used herein, refers to any positive whole number of items including one.

A package is reviewed according to a package review workflow 135. The package review module 113 creates a package review workflow 135 by interfacing with a persistent storage unit 105 that stores package review guidelines 125. The package review guidelines 125 describe the review tasks to perform on a package. The persistent storage unit 105 may be a local storage unit or a remote storage unit. The persistent storage unit 105 may be a magnetic storage unit, optical storage unit, solid state storage unit or similar storage unit. The persistent storage unit 105 can be a monolithic device or a distributed set of devices. The package review module 113 creates a unit of work 137 to represent a task as described by the package review guidelines 125. Examples of review tasks include determining whether the software package adheres to formatting rules, determining whether the software package adheres to package naming guidelines, running a program (e.g., rpmlint) on the package, determining whether a package can successfully compile and build, etc.). The package review module 113 uses the work units 137 to describe each task and each decision branch for reviewing a package to create a package review workflow 135. The package review workflow 135 and work units 137 are stored in a persistent storage unit 107. The work units 137 can be stored in a database, file system or similar data storage system.

The workflow module 115 manages the work units 137 (tasks) in the package review workflow 107. For example, the workflow module 115 initiates a task, monitors the status of each task, and determines a next task to be performed. Some tasks are performed by a server automatically and some tasks are performed manually (e.g., requiring a system user to perform a task). The workflow manager 115 manages the work units 137 whether or not a task is an automated tasks performed by the workflow server 103, an automated task performed by a web page on an external server 143, or a manual task performed by a user (e.g., a system user, a software package contributor, or a package reviewer). The workflow module 115 can prompt the package review module 113 to perform an automated review task on the workflow server 103. The workflow module 115 interfaces with an external web page module 119 to initiate and monitor an automated task performed by an external server 143. The workflow module 115 interfaces with the user interface module 121 to initiate and monitor review tasks performed manually by a system user (e.g., a package reviewer).

Each review task performed on the package has a task result. For example, a task determining whether the package can compile and build results in the package successfully compiling and building or in a list of compile and build errors. The workflow module 115 interfaces with package review module 113 for any automated tasks performed by the workflow server 103 to generate a task result. The workflow module 115 interfaces with the external web page module 119 for any automated tasks performed by an external server 143 to retrieve task results. The workflow module 115 interfaces with the user interface module 121 to receive a user input of the task result, via a user interface. The workflow module 115 stores each task result 139 in the persistent storage unit 107.

The workflow module 117 interfaces with a detection module 123 to analyze each task result 139 to determine whether one or more errors were detected when a review task was performed on the package. The workflow module 117 also interfaces with the detection module 123 to determine whether a waiver was received for the detected errors. A software contributor fixes the package to address any errors detected or obtains a waiver for any errors detected. The detection module 123 interfaces with the user interface module 121 to receive a user input (e.g., waiver), via a user interface, indicating whether a waiver was received.

The workflow module 115 determines when to send a notification, who to send a notification to, and the content of a notification. The workflow module 115 interfaces with a notification module 117 to generate and send notifications. The notification module 211 interfaces with a persistent storage unit 105 that stores the contact information 131 for sending a notification. The contact information 131 includes user contact information (e.g., package reviewers, software contributors).

The workflow module 115 interfaces with a user interface module 121 to provide a user (e.g., a package reviewer) a user interface for reviewing a package. The user interface module 121 provides a graphical user interface or command line interface for any number of remote machines 101A,B over the network 111. The user interface module 121 can be a web-based interface such as a web server or similar specialized interface to interact with the client on remote machines. Remote machines 101A,101B can be any type of computing device including desktop computers, laptop computers, handheld computers or similar computing device. The clients that access the user interface provided by the user interface module 121 can be general purpose browsers 141A,141B or specialized applications. The user interface module 121 interfaces the workflow server 103 with the remote machines 101A, 101B by making available the functionality of the workflow module 115.

The user interface module 121 interfaces with a persistent storage 107 that stores the package (e.g., a specification file and a package manager file) to be reviewed in the review queue 133 and interfaces with a persistent storage 105 that stores the package review guidelines 125. In one embodiment, the user interface module 121 displays the specification file and package manager file under review alongside the package review guidelines 125 in a package review user interface. The user interface module 121 allows a user (e.g., package reviewer) to review a software package knowing where in the review process the user is at. The user interface module 121 also interfaces with the persistent storage 105 that stores a basic specification file 127 and instructions 129 for creating a package manager file (e.g., a RPM file) to provide a package creation user interface. The user interface module 121 allows a user (e.g., software contributor) to create a software package using the basic specification file 127 and the instructions 129 for creating a RPM file.

The workflow module 115 stores a successfully reviewed package in a persistent storage unit 109 that stores successfully review packages e.g., a concurrent version system (CVS) repository). The persistent storage unit 109 may be a local storage unit or a remote storage unit. The persistent storage unit 109 may be a magnetic storage unit, optical storage unit, solid state storage unit or similar storage unit. The persistent storage unit 109 can be a monolithic device or a distributed set of devices.

The workflow module 115 interfaces with a permissions module 145 to assign and manage permissions (e.g., permission to edit a package) to a user (e.g., software contributor). The permissions module interfaces with the user interface module 121 to determine whether to assign permissions to the contributor for the package stored in the repository. The permissions module 145 creates permissions 147 and stores the permissions 147 in a persistent storage unit 107.

The workflow module 115 can interface with any of the other modules or components of the workflow server 103 including the package review module 113, external web page module 119, detection module 123, notification module 117, the user interface module 121 and permissions module 145 to automate a package review process and to generate a package review interface to be utilized by a user (e.g., package reviewer, software contributor). The workflow module 115 can be specifically designed to initiate the review of a package, automate package review tasks, monitor the status of a package undergoing package review, and notify package reviewers and software contributors of the status of the package under review.

Figure 2:
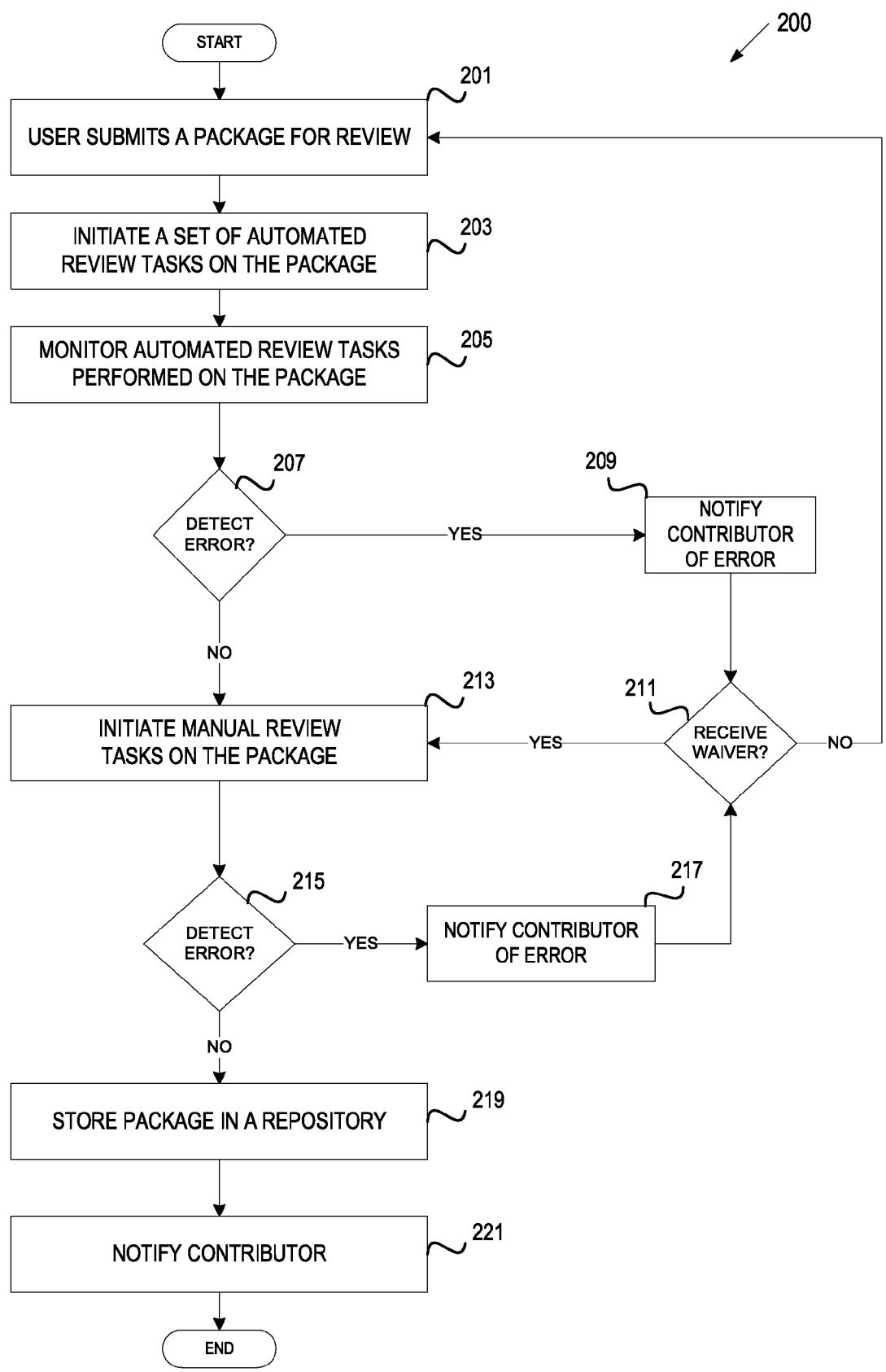
FIG. 2 is an overview flowchart of one embodiment of a process for automating and monitoring a package review process.

FIG. 2 is an overview flow chart of one embodiment of a process for automating and monitoring a package review process. In one embodiment, this process can be initiated by a user (e.g., software contributor) submitting a software package for review with the package review system (Block 201). For example, a contributor uploads a package to be reviewed for compliance with a set of package review guidelines. In one embodiment, the package is a software package that includes a package manager file (e.g., a Red Hat Package Manager (RPM) file) and a specification file. In another embodiment, this process can be initiated by a package reviewer to re-initiate the package review process on a package that has already been successfully reviewed. For example, a package reviewer decides to subject a package to a second review.

At block 203, a workflow module initiates a set of automated review tasks to be performed on the package. Where a workflow server performs one or more of the automated package review tasks, the workflow module instructs the package review module to perform the task. Where an external server performs one or more of the automated package review tasks, the workflow module interfaces with an external web page module to initiate the task performed by an external server.

At block 205, the workflow module monitors each automated review task performed on the package. Where the package review module performs an automated review task, the workflow module interfaces with the package review module to determine if the package review module has completed a task. Where an external server performs an automated review task, the workflow module interfaces with an external web page module to determine whether the external server has completed a task.

At block 207, the detection module determines whether an automated task reports one or more errors. For example, an automated review task for determining whether the software package adheres to formatting rules generates a list of formatting errors if errors are detected. If, at block 207, the detection module does not detect an error, the process continues to block 213. If, at block 207, the detection module detects an error, the workflow module notifies the contributor of the one or more errors at block 209. A contributor fixes any errors in the package and resubmits the package for review. Alternatively, a contributor obtains a waiver for the errors reported. At block 211, the detection module determines whether a waiver was received for the reported errors and whether a waiver was overridden by another package reviewer. The detection module interfaces with the user interface module to receive a user input (e.g., waiver), via a user interface, indicating whether a waiver was received. For example, a package reviewer issues a requested waiver by entering it as a comment in a user interface next to the issue (e.g. error detected) being waived. The detection module detects the waiver comment through the user interface module. The detection module also interfaces with the user interface module to detect whether the issued waiver was overriden by another package reviewer. Other package reviewers can override an issued waiver as a comment entered in a user interface. If, at block 211, the detection module determines that a waiver was not received for the reported errors or that a waiver was overridden by another package reviewer, the package remains in a review queue until the package review module receives a resubmitted package having the errors addressed at block 201. If, at block 211, the detection module determines that a waiver was received and that the wavier was not overridden, the process continues to block 213.

At block 213, the workflow module initiates a set of manual review tasks to be performed on the package. Some of the review tasks are tasks to be performed on a package by a package reviewer. A package reviewer is a person that is authorized to perform a review task. For example, a package reviewer examines the package to ensure the package is legible, has the appropriate sub-packages, and some review tasks involve a package reviewer making a phone call or sending an email message. The workflow module instructs the notification module to notify one or more package reviewers that the package successfully passed the automated review tasks and is ready for manual review. For example, the notification module sends an email to the contact information for each package reviewer. In another example, the notification module interfaces with the user interface module to display the package as a package ready for manual review in a user interface accessed by package reviewers. If a package reviewer accepts a package for manual review, the notification module sends an email notification to the package reviewer performing the manual review on the package.

At block 215, the detection module determines whether any of the manual tasks performed on the packaged result in one or more errors. The detection module interfaces with the user interface module to receive a user input (e.g., result data), via a user interface, indicating whether there is one or more errors. For example, a package reviewer enters a result that the package does not have the appropriate sub-packages and the package reviewer includes result data (e.g., lists the necessary sub-packages). If, at block 215, the detection module detects one or more errors, the workflow module instructs the notification module to notify the contributor of the errors at block 217 and the process returns to block 211 where the detection module determines whether a waiver was received for the errors detected.

If, at block 215, the detection module determines that the manual review tasks performed do not include any errors, the workflow module stores the package successfully complying with the package review guidelines in a repository (e.g., a CVS repository) at block 219. At block 221, the notification module notifies the contributor that the package was successfully reviewed. For example, the notification module sends an email to the contributor including the links and instructions on how to build the package. The notification module also interfaces with the user interface module to provide links in a contributor's queue displayed in a user interface.

Figure 3A:
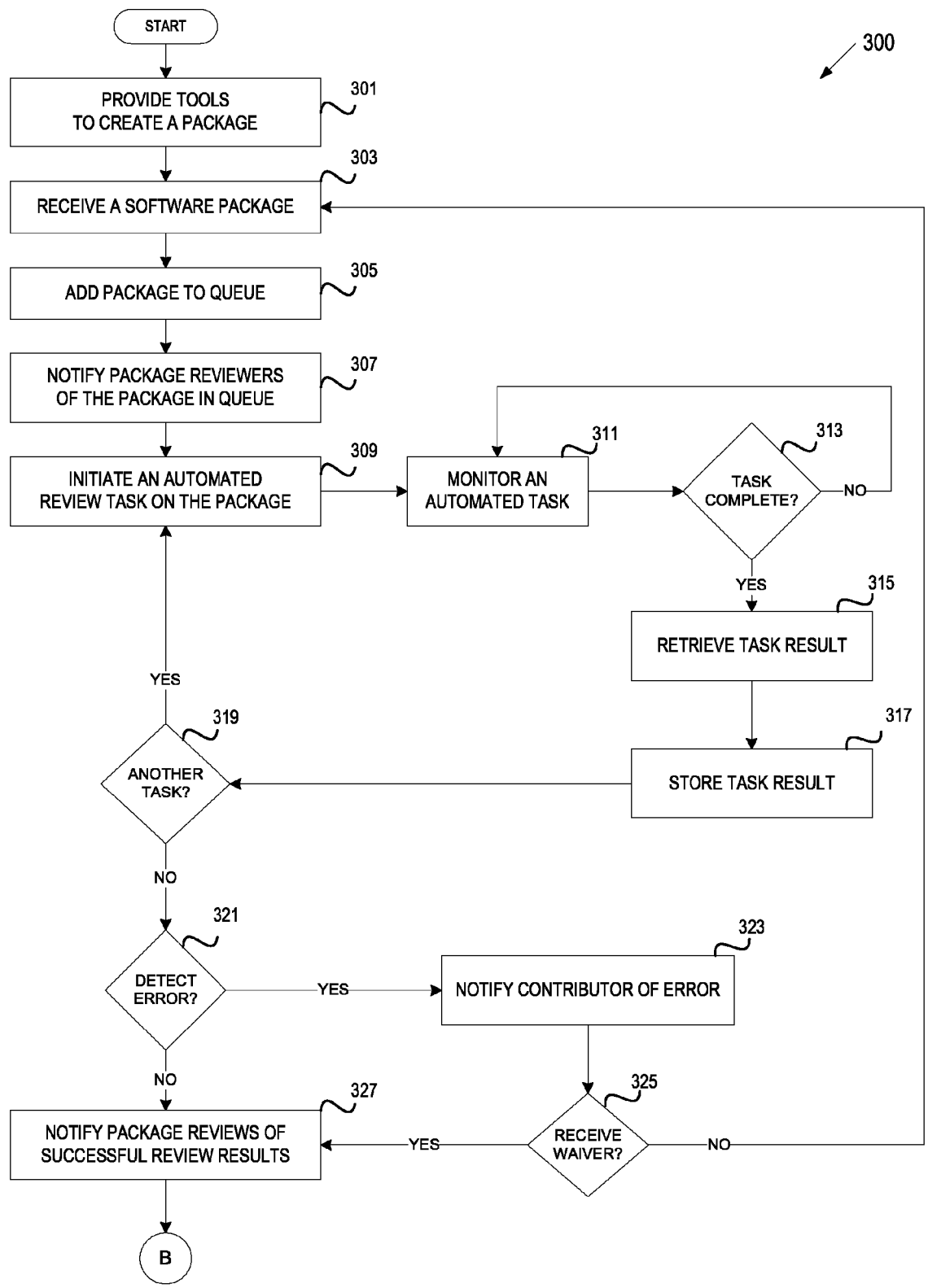
FIGS. 3A and 3B are flowcharts of one embodiment of a process for automating and monitoring a package review process.
Figure 3B:
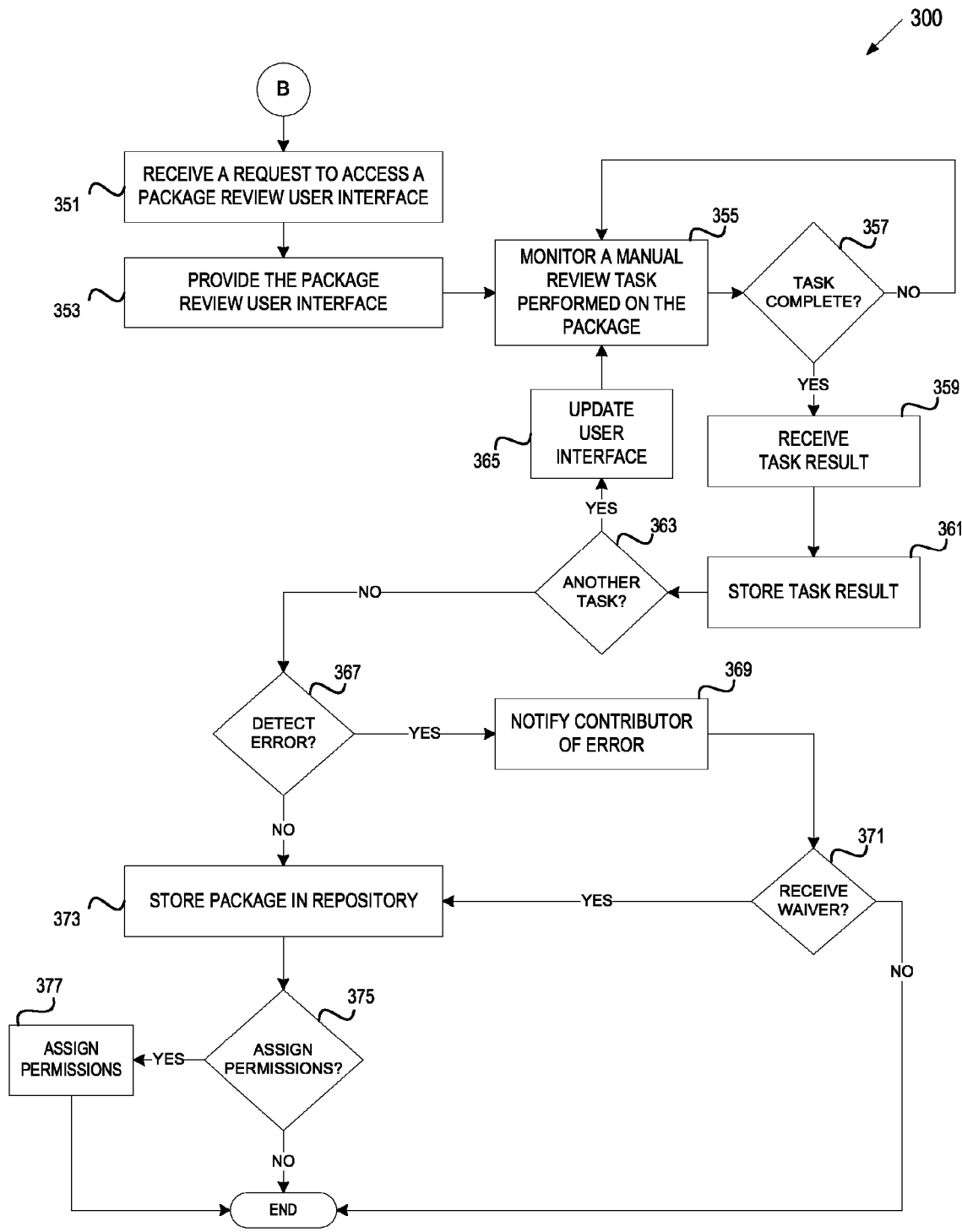

FIGS. 3A and 3B are flowcharts of one embodiment of a process 300 for automating and monitoring a package review process. In one embodiment, this process can be initiated by providing a user (e.g. software contributor) with tools to create a software package (Block 301). The user interface module generates a user interface providing a basic specification file and displaying step-by-step instructions for creating a package manager file (e.g., a RPM file).

At block 303, the package review module receives a software package including a specification file and a package manager file. At block 305, the package review module adds the package to a review queue. At block 307, the workflow module instructs the notification module to notify one or more package reviewers that a package is in the queue ready for review.

At block 309, the workflow module initiates an automated review task on the package. An automated review task is defined by a package review workflow. In one embodiment, the workflow module retrieves a package review workflow describing each review task and each decision branch for reviewing a package. In another embodiment, the package review module creates and stores a package review workflow by creating a unit of work corresponding to each task described in a set of package review guidelines. The workflow module automatically initiates an automated review task. In one embodiment, the workflow module initiates more than one task to be performed at one time. For tasks performed by the workflow server, the workflow module instructs the package review module to perform an automated task. For tasks performed by an external server, the workflow module interfaces with an external web page module to initiate an external server to perform an automated task.

At block 311, the workflow module monitors the automated review task performed on the package. The workflow module determines whether a task is complete at block 313. The workflow module determines whether a task is complete from the package review module performing an automated review task or from an external web page module for an external server performing an automated review task. If, at block 313, the workflow module determines that a task is not complete, the workflow module continues to monitor the task at block 311. If, at block 313, the workflow module determines that the task is complete, the workflow module generates or retrieves a task result at block 315. Where the package review module performs a review task, the workflow module interfaces with the package review module to generate a task result. Where an external server performs a review task, the workflow module interfaces with an external web page module to retrieve the task result from the external server. The workflow module stores the task results at block 317.

At block 319, the workflow module determines whether there is another automated task to be performed as defined by the package review workflow. If, at block 319, there is another task to perform, the workflow module returns to block 309 to initiate the next automated task. If, at block 319, the workflow module determines there is no other automated task to perform, the detection module determines whether the automated task result reports one or more errors at block 321.

If, at block 321, the detection module does not detect an error, the process continues to block 327. If, at block 321, the detection module detects an error, the workflow module notifies the contributor of the one or more errors at block 323. At block 325, the detection module determines whether a waiver is received for the reported error and whether the wavier was overridden by another package reviewer. If, at block 325, the detection module determines that a waiver was not received for the reported error or that a waiver was overridden by another package reviewer, the process returns to block 303 where the package review module waits to receive a resubmitted package addressing the error. The package remains in the review queue until a resubmitted package is received. If, at block 325, the detection module determines that a waiver was received and was not overridden by another package reviewer, the process continues to block 327. At block 327, the workflow module interfaces with the notification module to send a notification to one or more package reviewers that the package successfully passed the automated review tasks and is ready for manual review.

At block 351, the workflow module receives a request to access a package review user interface. For example, in response to receiving a notification that the package is ready for manual review, a package reviewer logs in to a package review user interface.

At block 353, the user interface module provides the package review user interface. In one embodiment, the user interface module presents a split-panel user interface including the specification file to be reviewed on one side and a set of package review guidelines on the other side.

At block 355, the workflow module monitors a manual review task being performed on the package. The workflow module interfaces with the user interface module to determine whether the manual review task is complete at block 357. The user interface module receives a user input that a task is complete. If, at block 357, the user interface module does not receive a user input that the manual review task is complete, the workflow module continues to monitor the task at block 355. If, at block 357, the user interface module receives a user input that a manual task is complete, the workflow module retrieves a task result from the user interface module at block 359. Each manual task performed on the package results in a task result. In one embodiment, the workflow module also retrieves data corresponding to the manual review task being performed from the user interface module. The user interface module receives the task result and data as a user input via the user interface. For example, a package reviewer enters, via the user interface, that a task has failed and includes a reason for the failure. At block 361, the workflow module stores the task result and the task result data. The task result and data may be stored in memory.

At block 363, the workflow module determines whether there is another task to be performed. If, at block 363, the workflow module determines that there is another task to be performed, the user interface module updates the split-panel package review interface with the package review guidelines corresponding to the next task at block 365. At block 355, the workflow module monitors the next manual task. If, at block 363, the workflow module determines that there is no other task to be performed, the detection module determines whether the manual task results report one or more errors at block 367. If, at block 367, the detection module detects one or more errors, the workflow module instructs the notification module to notify the contributor of the errors to be fixed at block 369.

At block 371, the detection module determines whether a waiver was received for the reported errors and whether a waiver was overridden by another package reviewer. The detection module interfaces with the user interface module to receive a user input (e.g., waiver), via a user interface, indicating whether a waiver was received. The detection module also interfaces with the user interface module to detect whether the issued waiver was overriden by another package reviewer. If, at block 371, the detection module determines that a waiver was not received for the reported errors or that a waiver was overridden by another package reviewer, the process ends and the package remains in a review queue until the package review module receives a resubmitted package having the errors addressed. If, at block 371, the detection module determines that a waiver was received and that the wavier was not overridden, the process continues to block 373.

If, at block 367, the detection module does not detect any errors, the workflow module instructs the package review module to store the package successfully complying with the package review guidelines in a repository (e.g., a CVS repository) at block 373.

At block 375, the workflow module instructs the permissions module to determine whether to assign permissions to the contributor for the package stored in the repository. For example, a package reviewer indicates, through a user input via the package review user interface, that the software contributor that submitted this package is approved to access and edit the package. The package reviewer also indicates, through a user input via the package review user interface, that he/she is the sponsor for the approval. If, at block 375, the permissions module determines to not assign permissions to the contributor, the process ends. If, at block 375, the permissions module determines to assign permissions, the permissions module assigns permissions at block 377.

Figure 4:
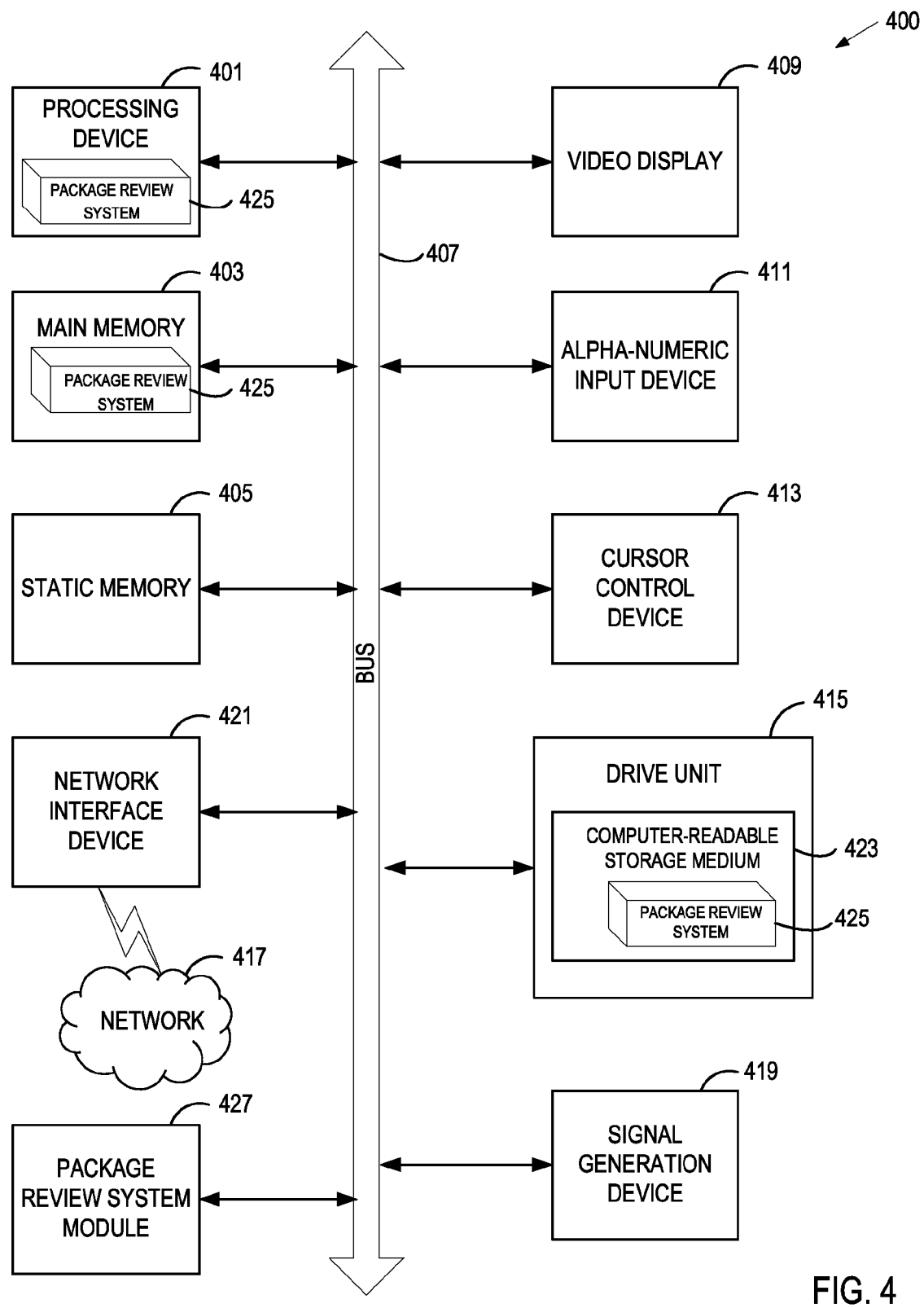
FIG. 4 is a diagram of one embodiment of the package review system.

FIG. 4 is a diagram of one embodiment of a computer system for package review. Within the computer system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 401, a main memory 403 (e.g., read-only memory (ROM), flash memory, dynamic random access memory (DRAM) such as synchronous DRAM (SDRAM) or Rambus DRAM (RDRAM), etc.), a static memory 405 (e.g., flash memory, static random access memory (SRAM), etc.), and a secondary memory 415 (e.g., a data storage device in the form of a drive unit, which may include fixed or removable computer-readable storage medium), which communicate with each other via a bus 407.

Processing device 401 represents one or more general-purpose processing devices such as a microprocessor, central processing unit, or the like. More particularly, the processing device 401 may be a complex instruction set computing (CISC) microprocessor, reduced instruction set computing (RISC) microprocessor, very long instruction word (VLIW) microprocessor, processing device implementing other instruction sets, or processing devices implementing a combination of instruction sets. Processing device 401 may also be one or more special-purpose processing devices such as an application specific integrated circuit (ASIC), a field programmable gate array (FPGA), a digital signal processing device (DSP), network processing device, or the like. Processing device 401 is configured to execute the package review system 425 for performing the operations and steps discussed herein.

The computer system 400 may further include a network interface device 421. The computer system 400 also may include a video display unit 409 (e.g., a liquid crystal display (LCD) or a cathode ray tube (CRT)) connected to the computer system through a graphics port and graphics chipset, an alphanumeric input device 411 (e.g., a keyboard), a cursor control device 413 (e.g., a mouse), and a signal generation device 419 (e.g., a speaker).

The secondary memory 415 may include a computer-readable storage medium (or more specifically a computer-readable storage medium) 423 on which is stored one or more sets of instructions (e.g., the package review system 425) embodying any one or more of the methodologies or functions described herein. The package review system 425 may also reside, completely or at least partially, within the main memory 403 and/or within the processing device 401 during execution thereof by the computer system 400, the main memory 403 and the processing device 401 also constituting computer-readable storage media. The package review system 425 may further be transmitted or received over a network 417 via the network interface device 421.

The computer-readable storage medium 423 may also be used to store the package review system 425 persistently. While the computer-readable storage medium 423 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 427, components and other features described herein (for example in relation to FIG. 1) can be implemented as discrete hardware components or integrated in the functionality of hardware components such as ASICS, FPGAs, DSPs or similar devices. In addition, the modules 427 can be implemented as firmware or functional circuitry within hardware devices. Further, the modules 427 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "facilitating," "storing," "monitoring," "determining," "creating," "establishing," "notifying," "assigning," "performing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for installing live operating systems to removable storage devices has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method comprising:
   receiving a package manager file and a specification file from a software contributor user;
   facilitating, by a computer system, a plurality of manual review tasks on the package manager file and the specification file in response to completing a plurality of automated review tasks on the package manager file and the specification file to determine whether the package manager file and the specification file comply with a set of package review guidelines, wherein facilitating comprises providing a user interface displaying the set of package review guidelines and at least one of the package manager file or the specification file to a package reviewer user;
   receiving a waiver submitted by the software contributor in response to an error from performing at least one of the plurality of automated review tasks or the plurality of manual review tasks;
   determining whether the waiver is overridden by the package reviewer user; and
   storing the package manager file and the specification file in a queue if the waiver is overridden by the package reviewer user and storing the package manager file and the specification file in a repository if the waiver is not overridden by the package reviewer user.

2. The computer-implemented method of claim 1, wherein a portion of the plurality of automated review tasks is performed by an external server.

3. The computer-implemented method of claim 1, further comprising:
   determining whether performing the plurality of automated review tasks is complete; and
   sending a notification to the package reviewer user that the package manager file and the specification file are ready for the plurality of manual review tasks in response to determining that performing the plurality of automated review tasks is complete.

4. The computer-implemented method of claim 1, further comprising:
   creating a plurality of work units, wherein each of the plurality of work units corresponds to a task described in the set of package review guidelines; and
   creating a package review workflow using the plurality of work units, wherein the package review workflow describes the plurality of automated review tasks and the plurality of manual review tasks to perform on the package manager file and the specification file.

5. The computer-implemented method of claim 1, wherein receiving the waiver comprises:
   determining there is the error in results of at least one of the plurality of automated review tasks or the plurality of manual review tasks; and
   notifying the software contributor user of the error.

6. The computer-implemented method of claim 1, further comprising:
   notifying at least one of the software contributor user or the package reviewer user of a status of the package manager file and the specification file under review.

7. The computer-implemented method of claim 1, further comprising:
   providing a basic specification file and instructions for creating the package manager file.

8. The computer-implemented method of claim 1, further comprising:
   assigning permissions to the package manager file and the specification file stored in the repository.

9. A non-transitory computer-readable storage medium, including instructions that, when executed by a processing device cause the processing device to perform a set of operations comprising:
   receiving a package manager file and a specification file from a software contributor user;
   facilitating, by the processing device computer system, a plurality of manual review tasks on the package manager file and the specification file in response to completing a plurality of automated review tasks on the package manager file and the specification file to determine whether the package manager file and the specification file comply with a set of package review guidelines, wherein facilitating comprises providing a user interface displaying the set of package review guidelines and at least one of the package manager file or the specification file being reviewed to a package reviewer user;
   receiving a waiver submitted by the software contributor in response to an error from performing at least one of the plurality of automated review tasks or the plurality of manual review tasks;
   determining whether the waiver is overridden by the package reviewer user; and
   storing the package manager file and the specification file in a queue if the waiver is overridden by the package reviewer user and storing the package manager file and the specification file in a repository if the waiver is not overridden by the package reviewer user.

10. The non-transitory computer-readable storage medium of claim 9, wherein a portion of the plurality of automated review tasks is performed by an external server.

11. The non-transitory computer-readable storage medium of claim 9, further comprising:
   determining whether performing the plurality of automated review tasks is complete; and
   sending a notification to the package reviewer user that the package manager file and the specification file are ready for the plurality of manual review tasks in response to determining that performing the plurality of automated review tasks is complete.

12. The non-transitory computer-readable storage medium of claim 9, further comprising:
   creating a plurality of work units, wherein each of the plurality of work units corresponds to a task described in the set of package review guidelines; and
   creating a package review workflow using the plurality of work units, wherein the package review workflow describes the plurality of automated review tasks and the plurality of manual review tasks to perform on the package manager file and the specification file.

13. The computer-readable storage medium of claim 9, wherein receiving the waiver comprises:
  determining there is the error in results of at least one of the plurality of automated review tasks or the plurality of manual review tasks; and
  notifying the software contributor user of the error.

14. The non-transitory computer-readable storage medium of claim 9, further comprising:
  notifying at least one of the software contributor user or the package reviewer user of a status of the package manager file and the specification file under review.

15. A system comprising:
  a memory;
  a processing device coupled to the memory configured to
    receive a package manager file and a specification file from a software contributor user;
    provide a user interface to facilitate a plurality of manual review tasks on the package manager file and the specification file in response to completing a plurality of automated review tasks on the package manager file and the specification file to determine whether the package manager file and the specification file comply with a set of package review guidelines, wherein the user interface displays the set of package review guidelines and at least one of the package manager file or the specification file being reviewed to a package reviewer user;
    receive a waiver submitted by the software contributor in response to an error from performing at least one of the plurality of automated review tasks or the plurality of manual review tasks;
    determine whether the waiver is overridden by the package reviewer user; and
  a data store coupled to the processing device to store the package manager file and the specification file in a queue if the waiver is overridden by the package reviewer user and to store the package manager file and the specification file in a repository if the waiver is not overridden by the package reviewer user.

16. The system of claim 15, wherein the processing device is further to:
  create a plurality of work units, wherein each of the plurality of work units corresponds to a task described in the set of package review guidelines, and
  create a package review workflow using the plurality of work units, wherein the package review workflow describes the plurality of automated review tasks and the plurality of manual review tasks to perform on the package manager file and the specification file.

17. The system of claim 15, wherein a portion of the plurality of automated review tasks is performed by an external server.

18. The system of claim 15, wherein the processing device is further to:
  determine whether performing the plurality of automated review tasks is complete; and
  notify the package reviewer user that the package manager file and the specification file are ready for the plurality of manual review tasks in response to determining that performing the plurality of automated review tasks is complete.

19. The system of claim 15, wherein receiving the waiver comprises:
  determining there is the error in results of at least one of the plurality of automated review tasks or the plurality of manual review tasks; and
  notifying the software contributor user of the error.

20. The system of claim 15, wherein the processing device is further to:
  provide a basic specification file and instructions for creating the package manager file.

* * * * *